United States Patent
Zainal Abidin et al.

(10) Patent No.: US 9,387,432 B2
(45) Date of Patent: Jul. 12, 2016

(54) SEPARATOR AND METHOD FOR SEPARATION

(75) Inventors: Shahrul Azman B Zainal Abidin, Kuala Lumpur (MY); Arul Jothy, Kuala Lumpur (MY)

(73) Assignees: PETROLIAM NASIONAL BERHAD (PETRONAS), Kuala Lumpur (MY); NGLTECH SDN.BHD., Kuala Lumpur (MY)

( * ) Notice: Subject to any disclaimer, the term of this patent is extended or adjusted under 35 U.S.C. 154(b) by 0 days.

(21) Appl. No.: 13/982,711

(22) PCT Filed: Jan. 30, 2012

(86) PCT No.: PCT/IB2012/000128
§ 371 (c)(1),
(2), (4) Date: Jul. 30, 2013

(87) PCT Pub. No.: WO2012/104700
PCT Pub. Date: Aug. 9, 2012

(65) Prior Publication Data
US 2013/0312614 A1   Nov. 28, 2013

(30) Foreign Application Priority Data
Jan. 31, 2011   (MY) .......................... PI 2011000489

(51) Int. Cl.
| | |
|---|---|
| *B01D 53/18* | (2006.01) |
| *B01D 53/14* | (2006.01) |
| *B01D 17/02* | (2006.01) |
| *B01D 45/02* | (2006.01) |
| *B01D 45/08* | (2006.01) |
| *B01D 21/02* | (2006.01) |

(52) U.S. Cl.
CPC ........ *B01D 53/1425* (2013.01); *B01D 17/0211* (2013.01); *B01D 17/0214* (2013.01); *B01D 45/02* (2013.01); *B01D 45/08* (2013.01); *B01D 53/18* (2013.01); *B01D 21/02* (2013.01); *B01D 2221/04* (2013.01)

(58) Field of Classification Search
None
See application file for complete search history.

(56) References Cited

U.S. PATENT DOCUMENTS

| | | | | |
|---|---|---|---|---|
| 2,899,014 | A * | 8/1959 | Sinex | 96/168 |
| 3,255,573 | A | 6/1966 | Cox, Jr. | |
| 3,413,778 | A * | 12/1968 | Lavery et al. | 96/190 |
| 4,583,998 | A * | 4/1986 | Reid et al. | 95/253 |
| 8,864,881 | B2 * | 10/2014 | Suppiah et al. | 95/249 |
| 2009/0113881 | A1 | 5/2009 | Lee et al. | |
| 2009/0282985 | A1 * | 11/2009 | Whiteley | 96/189 |

* cited by examiner

*Primary Examiner* — Duane Smith
*Assistant Examiner* — Phillip Shao
(74) *Attorney, Agent, or Firm* — Jeffrey G. Degenfelder; Carstens & Cahoon, LLP

(57) ABSTRACT

A separator system (5) comprising; a separation chamber (10) arranged to separate liquid from an inflow production fluid (45); at least one gas scrubber (15) for removing entrained liquid from a separated gas inflow from said separation chamber (10); wherein said at least one gas scrubber (15) is positioned above and proximate to said separation chamber (10), said gas scrubber (15) and separation chamber (10) connectable through a vertically oriented at least one liquid outflow conduit (20) arranged to direct the removed entrained liquid from the gas scrubber (15) to the separation chamber (10) wherein the conduit (20), is arranged such that an outflow end (22) of said conduit (20) extends into the separation chamber 10(10) such that it is lower than a minimum threshold liquid depth (65) in said separation chamber 10(10).

26 Claims, 10 Drawing Sheets

SEPARATOR AND METHOD FOR SEPARATION

This application is the U.S. national phase of International Application No. PCT/IB2012/000128 filed Jan. 30, 2012, which designated the U.S. and claims priority to PI 2011000489 filed Jan. 31, 2011, the entire contents of each of which are hereby incorporated by reference.

FIELD OF INVENTION

The invention relates to a system and method for the separation of gas and liquid, and particularly relates to applications for the oil and gas industry. In particular, the invention relates to a separator, and method of separation, in order to isolate gas, oil and water from a natural inflow prior to the refining process.

BACKGROUND

A conventional means of separating gas, oil and water is using a three-phase separator. However, field experience indicates that many of these systems experience significant liquid carry-over which has resulted in problems and damage of downstream facilities like the gas compressions. To mitigate this, an additional polishing scrubber is generally provided downstream of the bulk gas/liquid or gas, oil and water separators. This adds to space, weight and instrumentation (due to additional level monitoring and control) which in turn results in increased cost. The reliability, availability and maintainability of the system are also reduced due to the additional equipment and associated instrumentation.

For facilities where the inlet fluid is from a pipeline, slug flow in the pipeline results in significant sloshing, liquid entrainment and a drastic change in liquid level at the inlet separator. This turbulence at the inlet separator may result in a significant amount of liquid collecting around the gas outlet device at the separator. This, in turn, will result in both high liquid entrainment into the gas stream out of the separator and also potential blockage of the separator outlet device particularly if the liquid is waxy.

The blockages occur as a result of cold spots at the gas outlet device; with the effect made worse by the normally small flow path associated with the internals. "Sloshing" of the liquid phase may also lead to liquid coming into contact with the gas outlet device. For separators on a Floating Production Storage and Unloading Unit (FPSO), this is more pronounced as the ship's motion leads to greater movement of the liquid phase. If the liquid entrained in the gas stream is waxy, there is no means of removing the wax that builds up at the device unless the separator is taken offline, and the outlet device disassembled.

The need for high efficiency separation of the gas from the entrained liquids, for most applications, results in highly efficient gas outlet devices, or internals, being required at the separator. These internals may be mist mats, vane packs, cyclonic devices or other proprietary internals. However to accommodate the gas outlet device within the separator, the vapor space in the separator needs to be large enough to accommodate the device. This increases the size of the separator.

In particular, waxy crude that forms gel or crystalline structure at lower temperatures normally leads to a number of operational problems especially the ability of the fluid to flow and clogging of the instruments and internals that is integral to the performance of the equipment.

For facilities that handle waxy crude it is ubiquitous to inject Pour Point Depressant (PPD) to lower the pour point temperatures, and to maintain high production fluid temperatures in the equipments, pipes and instruments that handles the waxy crude. However it is unavoidable that some cold spots will develop within the system. These cold spots are located within the equipment or pipeline that experiences temperatures lower than the bulk fluid temperature. These cold spots are more prevalent in the gas phase where the specific heat of the gas is low. Low specific heat means that the gas gains or loses temperature faster.

The separation chamber, which receives the production fluid, is typically a three phase separator that carries out course separation of the production fluid into its individual phases. The problem of wax is compounded within all such separation, as the gas phase internals are normally built into the inlet separator and consists of small flow paths and parts, and further, with the gas phase in direct contact with the oil phase. Also, it has been found that slugging, or surges, lead to more liquids carryover in the gas phase.

For specific FPSO applications, the motion of the vessel may make the above problem worse.

Furthermore, there is no means for early detection of the waxing problems, and no means to fix the problem online if the wax begins to form.

And when wax begins to form, the problem is self propagating. Typically to mitigate liquid carry-over problems, a downstream gas scrubber is provided with liquid collected pumped back to the separator. This however increases the space and weight requirements and in addition increases the control, operational & maintenance complexity of the system.

A further problem involves slugging which is a challenging problem for many crude oil production receiving facilities particularly those receiving production from multi-phase subsea pipelines as they are susceptible to slugs. This is particularly the case for production facilities receiving crude and associated gas from remote wells via pipelines and risers. Slugs generated in the pipelines and risers not only require processing facilities to be increased in size to accommodate the slugs, but also results in production upsets associated with the high speed at which the slugs arrive and the transient pressure fluctuations due to the surge of gas following the arrival of the slug. Under these scenarios the production facilities like inlet heat exchangers, production separators and downstream gas compressors generally will not be able to cope with this transient slugging phenomenon resulting in production upsets and possibly shutdown.

Slugging results in the compression of the gas phase behind a slug. The transportation of a slug requires a larger pressure behind the slug to keep the slug moving through the pipeline and riser. This pressure increase depends on the size of the liquid slug. After the slug arrives at the outlet of the pipeline or production platform, the compressed gas creates a large gas surge, which again may result in major upsets in topside facilities, like the downstream gas compression trains.

The production from the remote wells, usually comprising large slug volumes is transported to the heat exchanger via pipelines or risers. Without any effective separation upstream, the slug flow conditions at the heater results in large heating duties of the exchanger as both the gas stream and the liquid streams are heated. The excessive heating duties results in poor performance of the heat exchanger, thus waxy crude and emulsions are still of existence in the outlet stream. Furthermore, the system experiences large pressure drop as the heating duty is high.

On the other hand, the existence of waxy crude and emulsions will cause blockages at the inlet and outlets of the separator. Although the separation of oil, gas and water can be performed, the exiting gas stream will comprise significant liquid entrainment that will cause damage to the condensing system, resulting in system shutdown. Hence, the reliability of the separator system is very low. In addition, these turbulences and the ineffective heating of the inlet fluids leading to the presence of water emulsion, inherent with multiphase fluids under slugging conditions will also result improper oil water separation in the separator. This will require the downstream system to be upsized due to excessive water carry-over in oil stream and excessive oil carry-over in the water stream.

Furthermore, the presence of sand in the production fluid often results in sand build-up in the downstream separator which in turn possibly requires frequent shutdowns to remove sand from the separator or requires sand removal devices to be installed at the separator which are expensive.

SUMMARY OF INVENTION

In a first aspect, a separator system comprising; a separation chamber arranged to separate liquid from an inflow production fluid; at least one gas scrubber for removing entrained liquid from a separated gas inflow from said separation chamber; wherein said at least one gas scrubber is positioned above and proximate to said separation chamber, said gas scrubber and separation chamber connectable through a vertically oriented at least one liquid outflow conduit arranged to direct the removed entrained liquid from the gas scrubber to the separation chamber wherein the conduit is arranged such that an outflow end of said conduit extends into the separation chamber such that it is lower than a minimum threshold liquid depth 65 in said separation chamber.

With the separator having a gas scrubber in close proximity, the ability to more efficiently recycle liquid, the invention is able to reduce space and save on capital infrastructure costs, providing advantage over the prior art.

In one embodiment, by actually mounting the scrubber to the separation chamber, further space savings may be achieved.

In a further embodiment, the conduit may be arranged such that an outflow end of said conduit extends into the separation chamber. Further, the outflow end will extend into the separation chamber such that it is lower than a minimum threshold water depth in said separation chamber.

In one embodiment, the separator system may include a slug handling device for managing and/or removing slugs from the inflow production fluid. The slug handling device may include a separation device receiving the inflow production fluid through an inlet pipe. The separation device may be inclined to promote gravity flow, so as to separate a gas stream and liquid stream through gravity. The slug handling device will include a stilling well for receiving the separated liquid.

The said stilling well may have a sand trap so as to allow solids within said separated liquid to settle through gravity. The stilling well may also include an outlet above the sand trap so as to discharge said separated liquid to the separation chamber.

The slug handling device may be a separator arranged to create a stratified flow regime and with total hold-up volume sized to accommodate the anticipated slug volume for said inflow production fluid so as to yield the separation of the gas stream and liquid stream. Alternatively, the slug handling device may include a pipe having an expanded diameter, such as having a diameter larger than the diameter of the inlet pipe. This expanded diameter may be sized so as to achieve the stratified flow regime and with total hold-up volume sized to accommodate the anticipated slug volume.

In a further embodiment, the slug handling device may also include a gas bypass pipe for routing separated gas from the separation device to gas scrubber.

The stilling well will have the outlet located above the sand trap, and further the pipe may be inclined upwards so as to prevent sand from exiting said stilling well. Further, the outlet may include a control valve for controlling the flow of liquid to the separator chamber.

In one embodiment, the stilling well may include a sand removal assembly within the sand trap, said sand trap assembly including at least cyclonic device for agitating sand into suspension, and a valve controlled outlet for discharging liquid having the sand in suspension. In effect, having the sand in suspension allows the sand to be moved by flowing the liquid out of the sand trap, and thus using the liquid as a sand removal medium. Further, the sand removal assembly may also have an intermediate sand trap having a further valve controlled outlet arranged such that the liquid is discharged to the intermediate sand trap, prior to final discharge. Further still, the intermediate sand trap includes a further cyclonic device for agitating liquid in the intermediate sand trap prior to final discharge.

BRIEF DESCRIPTION OF DRAWINGS

It will be convenient to further describe the present invention with respect to the accompanying drawings that illustrate possible arrangements of the invention. Other arrangements of the invention are possible, and consequently the particularity of the accompanying drawings is not to be understood as superseding the generality of the preceding description of the invention.

DETAILED DESCRIPTION

The invention provides a separator developed for the oil and gas industry where a two phase (gas and liquid) or 3 phase (gas, oil and water) separator which, in various embodiments, may have the advantages of providing high liquid droplet removal efficiency, may be compact with minimal space and weight and may require less controls and instrumentations. The system may be suitable for both onshore and offshore applications where space is limited and may be suitable for waxy and fouling fluid services and for facilities where motion effects are high, e.g. FPSOs.

Figure 1:
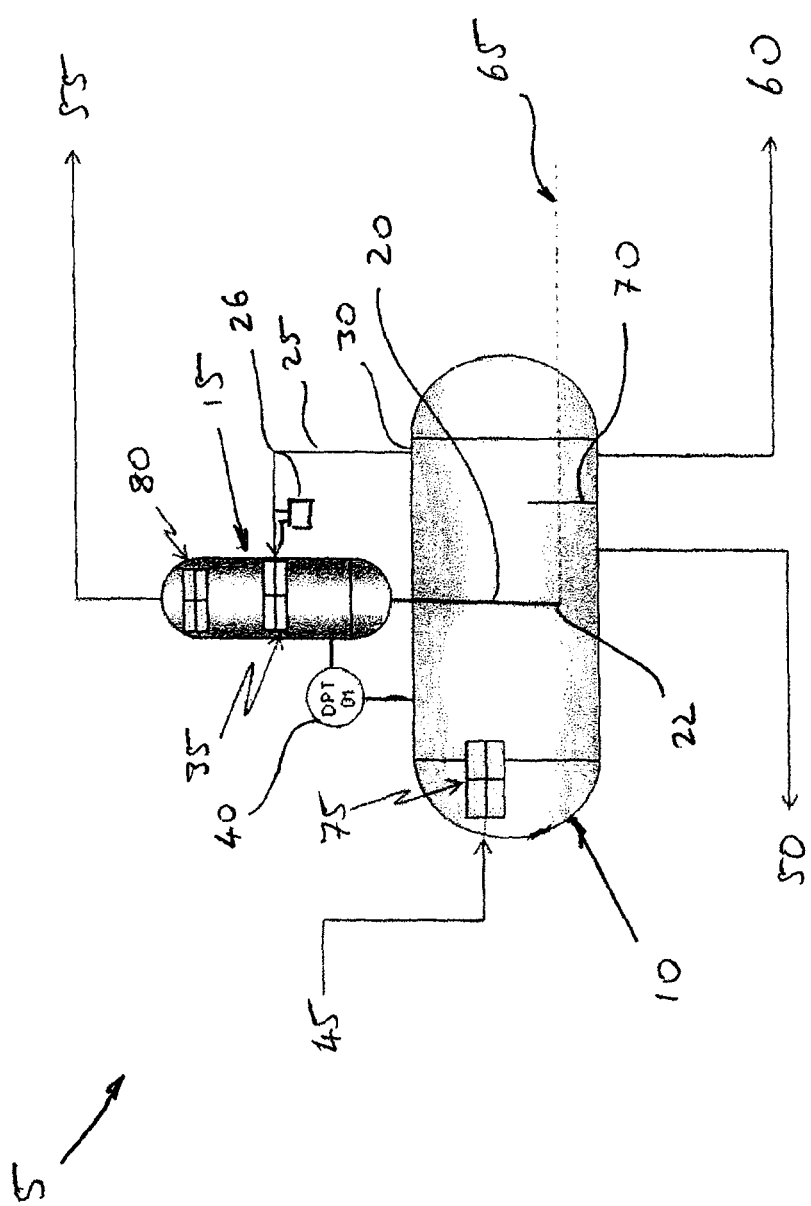
FIG. 1 is a schematic view of a separator system according to one embodiment of the present invention.

FIG. 1 gives the schematic of the separator system 5 of this invention to enable bulk gas/liquid separation and efficient gas polishing. The separation system 5 comprises two sections, the bulk gas liquid separation chamber 10 and a gas polishing scrubber section 15 as an integrated unit 5.

The separator chamber 10 is similar to a three phase gas-liquid separator whereby production fluid 45 comprising a gas and liquid phase passes into the separation chamber 10 through an inlet device 75. The separation chamber 10 includes separate chambers where the separated liquid forms a liquid pad in the base of the chamber which is divided by a barrier 70 into the water phase which is drained 50 for treatment and a crude oil phase which is drained 60 for processing.

The difference between the present invention and the conventional system lies in the placement of a gas scrubber 15 mounted above the separation chamber 10 and connected through a connecting pipe 25 to flow gas from the gas phase in the separation chamber 10 through to the gas scrubber 15 whereby a further separation process occurs through gas polishing to remove remnant liquid from the gas which is drained through a vertically oriented liquid conduit, or downcomer pipe 20, back into the separation chamber 10. The gas then exits through an gas outlet demisting device 80 to the gas outlet line 55 for further processing.

The termination 22 of the downcomer pipe 20 is to be below the low liquid level 65 in the horizontal separator 10 to ensure that gas does not bypass the separator 10 via the downcomer pipe 20 under all operating conditions. To avoid accumulation of oil phase in the downcomer pipe, the pipe may be terminated above the high oil-water interface level of the horizontal separator 10. The pressure drop of the gas from the horizontal separator section 10 to the vertical scrubber section 15, including the scrubber inlet device 35 is to be less than the static liquid head in the downcomer pipe 20 from high liquid level in the horizontal separator to the bottom of the vertical scrubber. This will ensure that liquid from the liquid pad of the separator section does not rise up the downcomer pipe to the scrubber, due to siphon effect.

Since the separator 10 and scrubber 15 share a common liquid pad within the separator, the scrubber need not have a liquid collection booth. This minimizes the size and height of the scrubber 15.

A differential pressure transmitter 40 between the scrubber section 15 and separator section 10 enables the system to monitor the level of liquid in the downcomer pipe and to trouble-shoot the system.

The separator system 5 is arranged to have the horizontal vessel, or separation chamber 10, piggy backed with a vertical gas scrubber 15. The bulk gas/liquid separation will be in the horizontal part 10 of the system 5 while gas scrubbing/polishing is performed in the vertical part 15 of the system. Gas, with entrained liquid, will exit the horizontal separator section 10 via an outlet deflector plate 30. In this embodiment, a speciality gas outlet device like a mist mat, vane pack, etc is not provided at the gas outlet section 30 of the horizontal separator section 10 for the following reasons:

Removal of entrained liquids from the gas is performed at the vertical scrubber section 15 of the separation system 5.

Providing the gas outlet polishing device here will expose it to contact with the bulk liquid phase in the horizontal section of the separation system. This is particularly the case when liquid slugs are present in the incoming production fluid with associated turbulences and liquid sloshing effects.

In the case when the liquid is waxy, there will be a risk of the liquid outlet device being blocked or flow restricted due to wax build-up at the device.

With the elimination of the gas outlet device, the diameter of the horizontal separator section may be reduced, this saving weight and space.

Pressure drop of the system may be minimized.

An expanded connecting pipe 25, sized to minimize pressure drop routes gas (with entrained liquid) to the vertical gas scrubber section.

The vertical gas scrubber section 15 is sized for the process conditions and gas flow and liquid carry-over from the horizontal separator section 10. The scrubber 15 is provided with typical internals designed to enhance gas liquid separation. An inlet distributor 35 is provided at the scrubber to reduce the inlet velocity and to give a good gas distribution in the vessel. An outlet device 80, which in this case may be a gas outlet demisting device having a mist mat, vane pack, cyclonic or other proprietary internals depending on the specific application requirements.

A heat exchanging device may also be incorporated into the gas scrubber. Such a heat exchanger (not shown) may be arranged to dissipate heat from the inflow of gas. Alternatively, a heat exchanger within the body of the gas scrubber may be used so as to dissipate heat from gas within the scrubber. Conventional heat exchangers may be used for this purpose. The scrubber section may thus also function to cool the gas stream (separated gas inflow) and for final liquid droplet removal from the gas stream. This may avoid the need to provide an additional cooler downstream of the scrubber section prior to routing to the downstream processing facilities.

In the case when the production liquid is waxy or fouling, a wax or fouling matter removal system 26, comprising a nozzle mounted to the inlet or connecting pipe 25, may be provided to enable hot water flushing of the inlet device 35 (due to wax blockage) as required. Potential blockage or flow restriction at the inlet device 35 is monitored by the differential pressure transmitter 40. High differential pressure may signify fouling at the inlet device 35 of the gas scrubber due to wax deposition, etc. In addition, the wax removal system 26 may also be provided at the gas outlet device liquid draining compartment to remove blockages/restrictions as required. Whilst hot water may be used for the removal of wax, in fact any one or a combination of water, steam, diesel or any other solvent may also be used.

The advantages with combining the two sections 10, 15 may include:

Both sections may share a common liquid control system thus minimizing control and operational complexity of the system.

Size of scrubber is independent of liquid carry over rate as the liquid handling request is maintained within the separator section.

For waxy fluids, both sections may share a common heating system to avoid wax formation in the liquid pad of either section.

Figure 2:
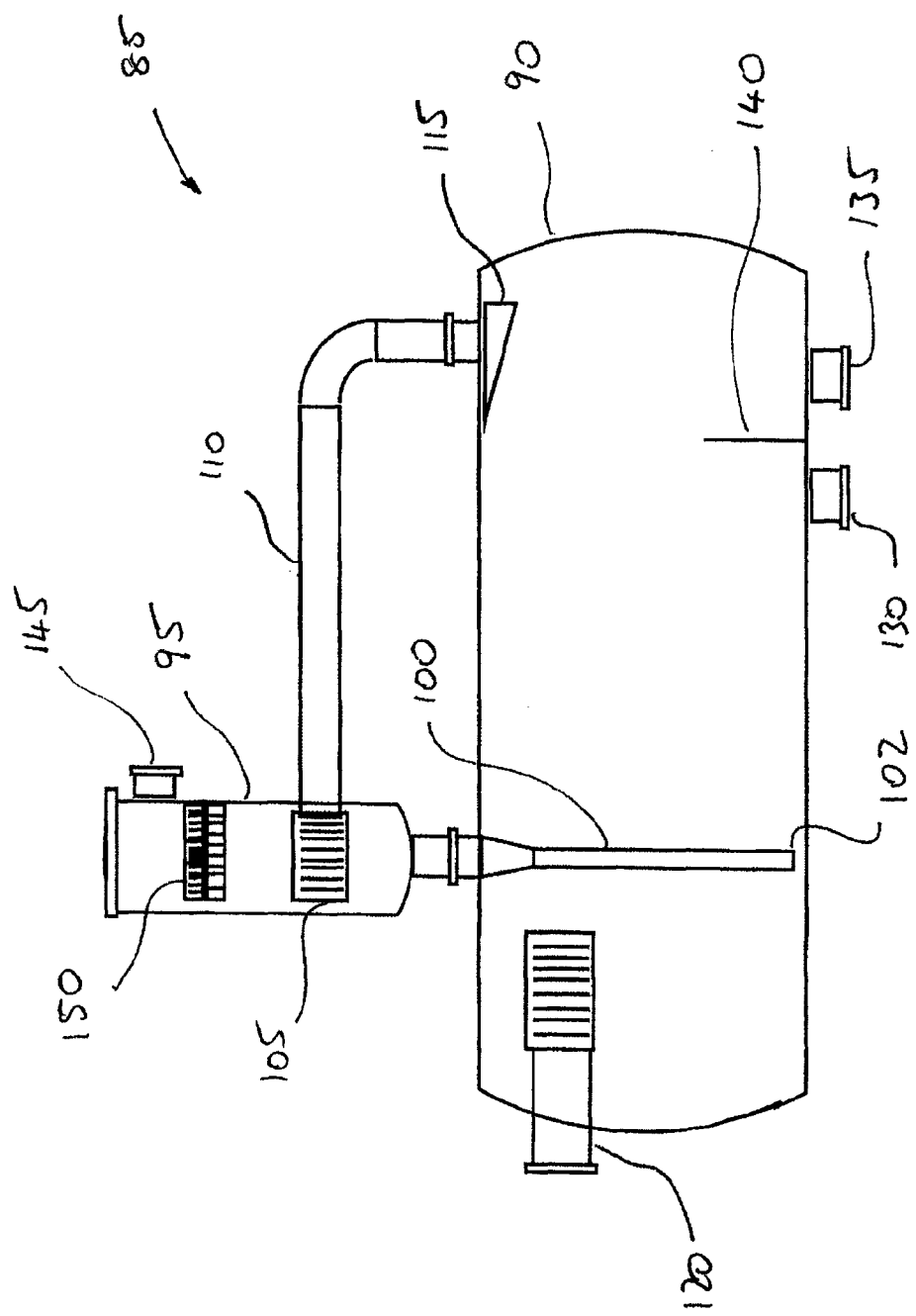
FIG. 2 is an elevation view of a separator system according to a further embodiment of the present invention.

Various embodiments of the present invention comprise the following components:

FIG. 2 shows an actual vessel 85 constructed in accordance with the present invention. Here a separation chamber 90 has mounted thereto a gas scrubber 95 with a downcomer pipe 100 extending into the separation chamber. The position of the exit 102 of the pipe 100 is positioned near the base of the separation chamber 90 so as to be below a minimum threshold level of the liquid pad within the separation chamber. The separation chamber 90 includes an inflow 120 for receiving a gas liquid supply with a connecting pipe 110 for directing the separated gas from the separation chamber 90 to the gas scrubber 95. The gas first passes through a deflection plate 115 before entering the connecting pipe 110 and than passes through an inlet device 105 before entering the gas scrubber 95. The gas is then scrubbed to remove the remaining liquid and routing the gas through an outlet device 150 and subsequently through an outlet 145. The remaining liquid is transported back into the separator vessel 90 through a conduit 100. The separation chamber 90 further includes outlet 125 and liquid outlets for water 130 and crude oil 135 from respective chambers separated by a barrier 140.

It would be appreciated that the scrubber 95 may be mounted directly to the separation chamber 90 as shown in FIG. 2. Alternatively, a framework supporting the gas scrubber 95 may support the gas scrubber in a position above the separation chamber but not actually mounted thereto.

The separation vessel 85 functions in the following manner:
1. Full well stream fluid is first routed through an inlet heater, the heater ensures that the fluid is above WAT and sufficient to break the emulsion.
2. The separator system comprises two distinct sections:—
   a. Horizontal section 90 that bulk separation occurs and water is separated from the crude.
   b. Vertical section 95 that houses the gas separation device that performs final polishing of the gas stream.
3. The inlet device 105 for the gas stream is located on the vertical scrubber section 95 that is isolated from the bulk liquid section.
4. The gas outlet from the separation chamber comprises a deflector plate 115 that inhibits the carryover of the bulk fluid into the gas phase and minimizes pressure drop.
5. The gas will flow through a pipe section 110 sloped back into the separation chamber 90.
6. The gas separation internals are located at the vertical section 95.
7. There will be a downcomer pipe 100 that will allow for any liquid separated in the vertical section to re-enter the main vessel that is terminated below the liquid level in the horizontal separator.
8. The gas separation device can be installed with differential pressure instruments to monitor the condition of the internals.
9. A source for hot water can be connected to the internals that can allow for on-line cleaning of the gas internals.
10. As the main gas polishing occurs in the vertical scrubber section of the vessel, gas section on the horizontal vessel can be reduced.
11. Since there will be no isolation valves between the horizontal and vertical vessel there will be no additional Pressure Safety Valves (PSV) required.

Figure 3:
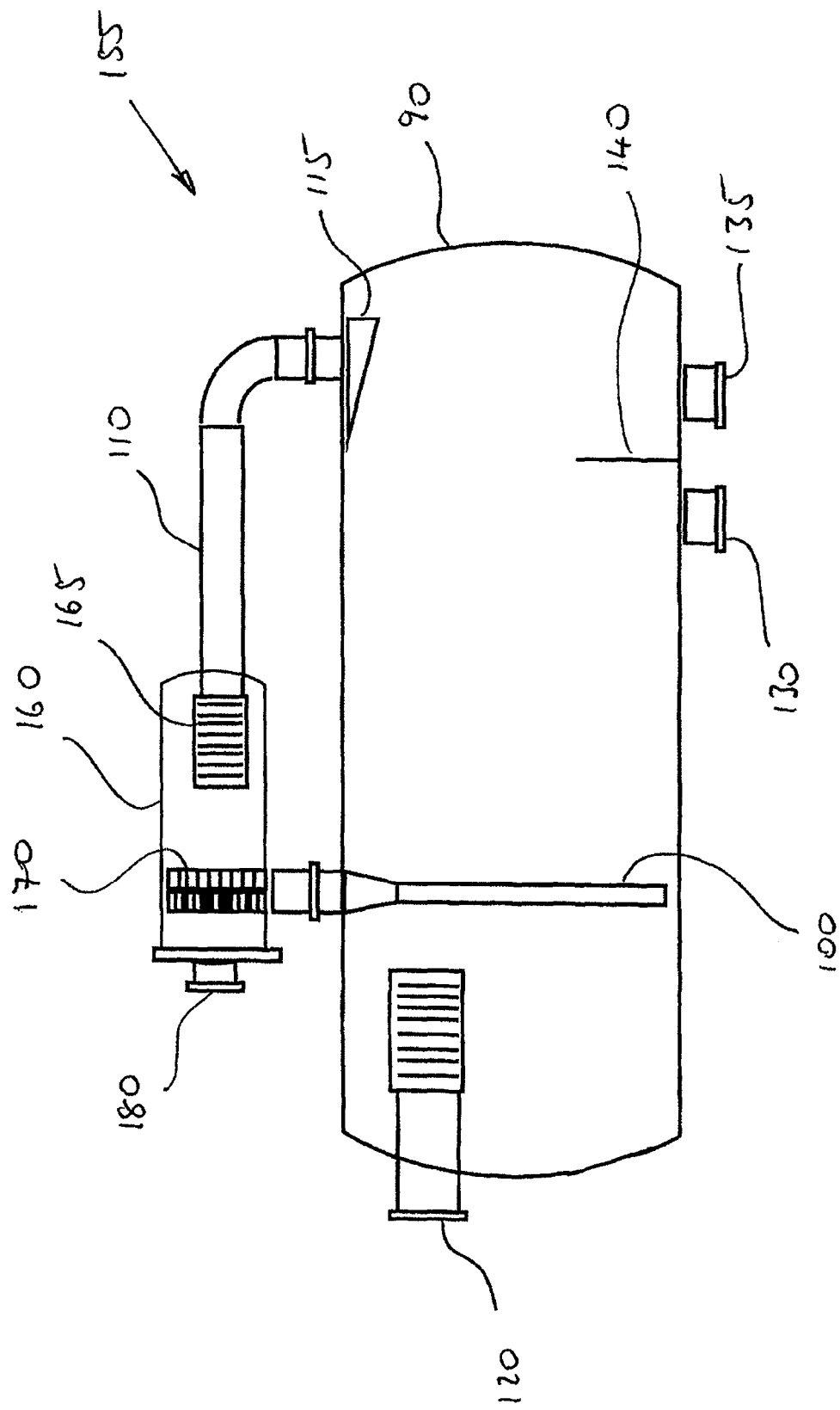
FIG. 3 is an elevation view of a separator system according to a further embodiment of the present invention.

One alternative configuration to the above option is to have a horizontal gas separation section so that the separator vessel will have a lower overall height as shown in FIG. 3.

Here the separation chamber 90 is configured in the same way that of the embodiment of FIG. 2. However, the position of the gas scrubber 160 is in a horizontal alignment. An inlet device 165 is still used as is an outlet device 170 and dehydrated gas outlet 180 and downcomer pipe 100 for draining liquid into the separation chamber 90.

A typical crude stabilization train comprises 2 to 3 stages of separation and the flash gas from the 3-phase separators are re-compressed. Conventionally, this is achieved through multi stages of 3-phase separator operating at progressively lower pressure to meet the vapor pressure specification of the product crude where the outlet gas stream passes through gas scrubbers just upstream of the compressor suction for final polishing and to provide surge volume.

Figure 4:
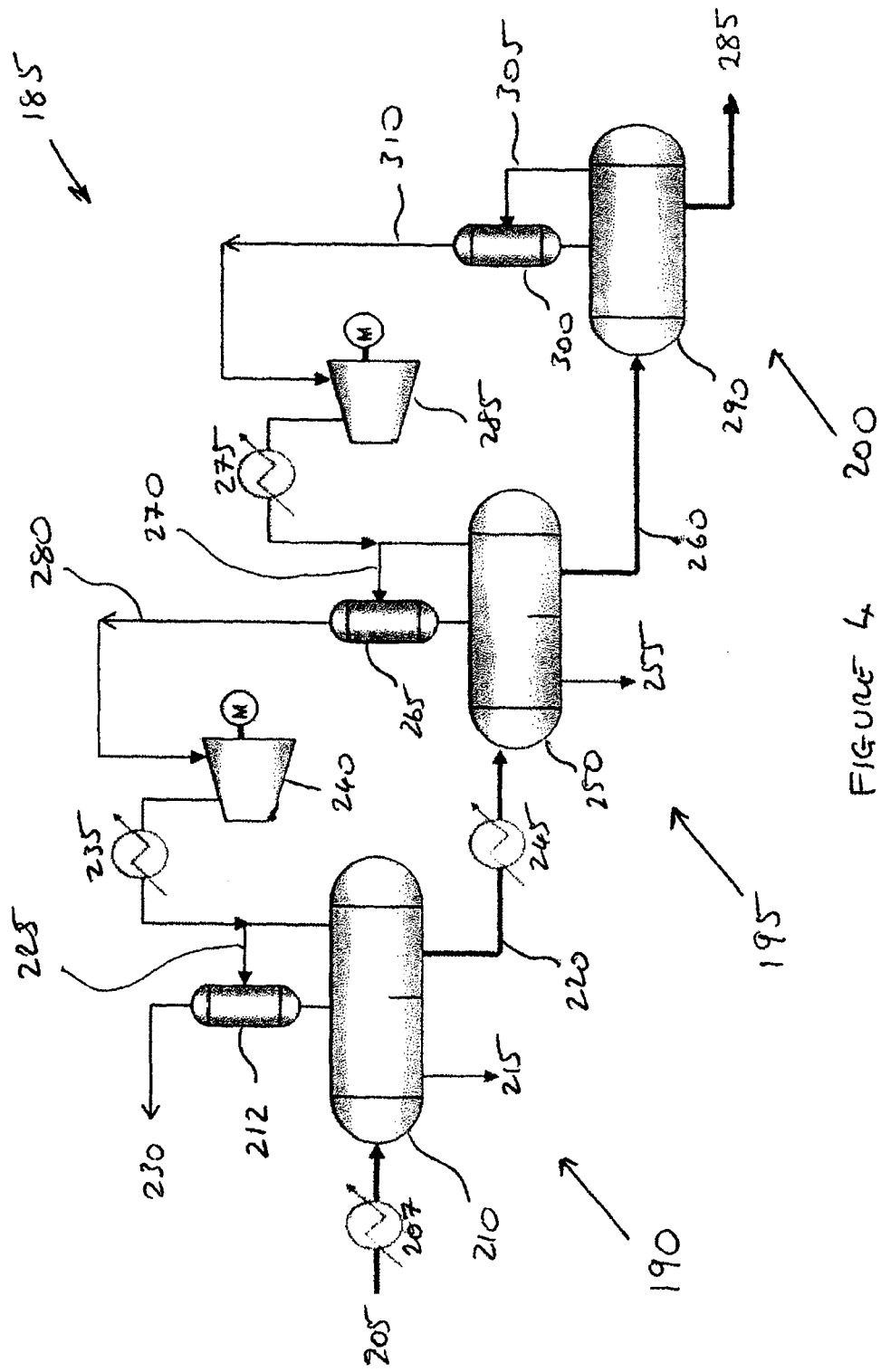
FIG. 4 is a schematic view of a crude stabilization train according to a further embodiment of the present invention.

FIG. 4 shows a crude stabilization train 185 according to the present invention. In such a system, the outlet gas from the integrated scrubber may be fed directly into the flash gas compressor 240, 285. Thus not only do the 3 phase separators 210, 250, 290 reduce in size, the gas scrubbers 212, 265, 300 also reduce in size. Overall the system may provide a very compact stabilization train.

The crude stabilization train 185 shown in FIG. 4 comprises a system whereby a gas/liquid fluid 205 flows into a first separator stage 190 via a heater 207. The result is the separated gas outlet 230 by a first gas scrubber 212 from the crude stabilization train 185, and the flow of crude for dehydration and storage removal 285. Water is also removed 215, 255 from the crude stabilization train 185. The crude stabilization train system itself comprises a three-stage process with each stage representing a separation system according to the present invention that are operated of progressively lower pressures to meet the vapor pressure specification of the final crude product, 285. The first stage 190 receives the fluid 205 and sending 225 gas back to its gas scrubber 212 which removes the remnant liquid and directs the separated gas for processing 230 whilst directing the liquid back to the separation chamber 210 of the first stage 190 and water is drained through outlet 215.

The crude is sent 220 to the second stage 195 via an inter-stage heater 245 where it is received by a second separator chamber 250. Gas sent 270 to the second gas scrubber 265 is scrubbed and delivered 280 to a flash gas compressor 240 which cools 235 the gas before delivering back to the first scrubber 212. Water is drained 255 and the subsequent crude sent to the third stage 200 to be received by the third separation chamber 290 which removes 305 the final gas to the third gas scrubber 300 and delivers 285 the crude for processing.

The gas removed from the third stage 200 is sent to a second flash gas compressor 285 which cools 275 the gas before delivering it to the second gas scrubber 265.

Thus, a three-stage process of continually separating and scrubbing the gas is substantially reduced in its footprint and with the proximity of the three-stages with the corresponding gas scrubbers substantial savings in capital infrastructure and instrumentation may also be achieved.

Table 1 below shows the comparison of the size of the separators/scrubbers for the 2 options based on a typical production facility.

TABLE #1

Size Comparison

| Vessel Size | Conventional | Embodiments |
| --- | --- | --- |
| 1$^{st}$ Stage Separator | 4.2 m × 12 m | 3.7 m × 9.7 m |
| 2$^{nd}$ Stage Separator | 3.0 m × 10.1 m | 3.0 m × 9.3 m |
| 3$^{rd}$ Stage Separator | 3.0 m × 9.5 m | 3.0 m × 8.9 m |
| 1$^{st}$ Stage Scrubber | 2.7 m × 3.7 m | 1.9 m × 2.5 m |
| 2$^{nd}$ Stage Scrubber | 1.2 m × 3.9 m | 1.0 m × 2.5 m |
| 3$^{rd}$ Stage Scrubber | 1.4 m × 3.5 m | 1.0 m × 2.5 m |

It indicates that with the separators of the present invention, there is significant size and weight benefits to the system resulting in a compact crude stabilization train. As the scrubbers are located above the respective separators, further significant space and weight saving is realized. In addition, significant instrumentation, controls and shutdown functions are removed with the separator system resulting in reduced control, operational and maintenance complexity of the system. It also results in higher system availability.

The concept of installing a scrubber provides a convenient and efficient way of increasing the gas handling capacity of the separator either for a "brownfield" modification or refurbishment of used equipment. Many operating facilities presently experience significant problems due to liquid carry-over from the bulk gas liquid separators to the gas compression trains resulting in mechanical damage to compressor impellers, etc. The proposed configuration of the separator system may provide a cost effective option of installing a gas scrubber on top of an existing separator to polish the gas stream exiting the separator without the need of significant space and adding weight to the existing facilities. In addition it may also avoid the need for additional controls and shutdowns.

Figure 5A:
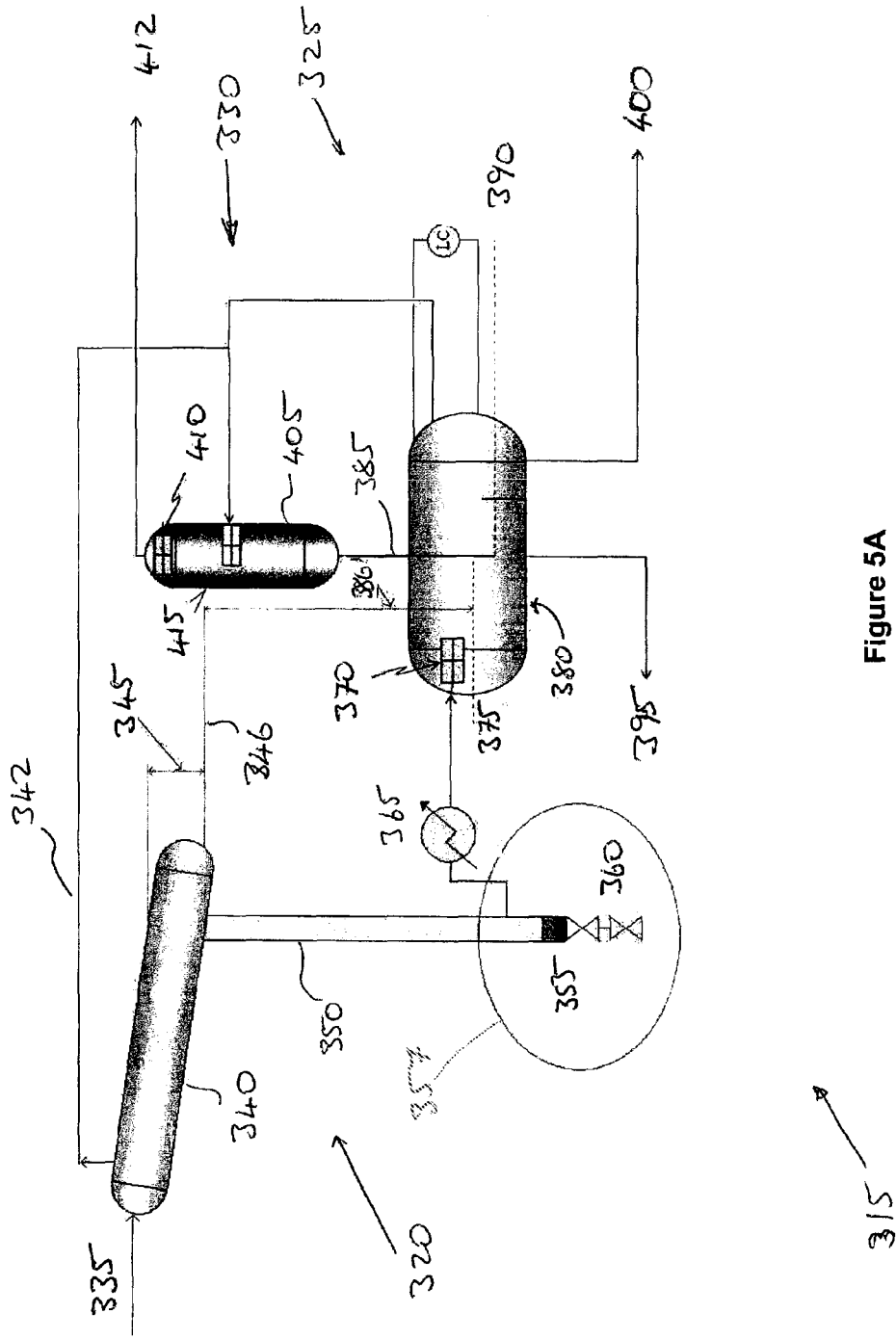
FIGS. 5A and 5B are schematic views of a slug handling system and separator system according to one embodiment of the present invention.
Figure 5B:
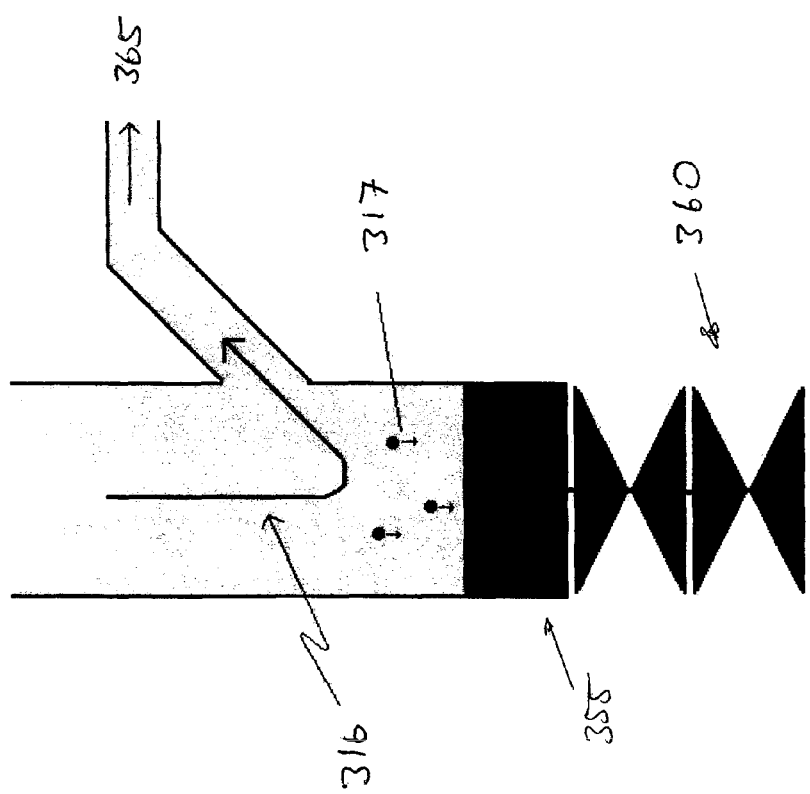

FIGS. 5A and 5B show schematic views of the separator configuration 315 according to one embodiment of the present invention. This embodiment provides slug handling, bulk gas/liquid separation and efficient gas polishing. The separation system 315 comprises 3 sections, the slug handling section 320, the bulk gas liquid separation section 325 and a gas polishing scrubber section 330 as an integrated unit.

The Slug Handling section 320 comprises a separation pipe inclined to the horizontal, such as a horizontal expanded pipe 340 or other such separator/system, capable of gas and liquid separation of fluid (such as FWS fluid), that has a Gas Bypass Line 342 at its upper section and is in operational connection with a pipe known as a Stilling Well 350 at its lower section. The Slug Handling device 340 may be a conventional separator or a pipe piece with or without internals that is positioned horizontally with a slight tilt to enable the liquid to flow effortlessly into the Stilling Well 350. Only coarse gas/liquid separation may be performed in the slug handling device 340 as final separation is undertaken at the gas polishing scrubber section 330 and the bulk gas/liquid separation section 325. As such, the slug handling device may be sized as a minimum to ensure flow in this section is in the stratified flow regime and to accommodate the anticipated slug volume arriving.

In operation, fluid such as FWS fluid is first routed to the slug handling device 340 for gas and liquid separation after which the liquids, including liquid slugs, are diverted into the Stilling Well 350 and the gas is routed to the Gas Bypass Line 342. The Gas Bypass Line 342 routes the gas stream to the Gas Scrubber 405 ensuring that the pressure in the Slug Handling device 320 is almost equal to that at the Gas Scrubber 405 and Separator 380. This configuration ensures that the discharge of the liquid from the Stilling Well 350 to the Separator 380 via the heat exchanger 365 and/or restriction orifice (not shown in diagram) is only dependent on the differential static head 386 of the liquid level in the Stilling Well 350 and at the Separator 380. The height of the Stilling Well 350 is predetermined to provide sufficient liquid head 386, between the normal liquid level 346 and the liquid level 375 in the separation chamber 380, to overcome pressure drop of the liquid travelling from the stilling well 350 to the separation chamber 380. Under normal steady state design flow conditions, the system hydraulics is configured to maintain liquid level 346 near to base of the slug handling device 340 and within the stilling well 350.

The horizontal position of the slug handling device 340, its geometry (long and thin) and its overall volume ensures that the arrival of liquid slugs does not increase liquid head 345 significantly while the slugs are accommodated in the slug handling device, thus minimizing the incremental liquid head 345. As the liquid flow is dependent on the available liquid head, the position and geometry ensure a steady flow through the heater 365 into the separator even with the arrival of large liquid slugs. Consequently, this ensures good temperature control and performance of the heater and minimizes turbulence in the downstream separator, enabling good 3 phase separation. In addition the system also ensures that pressure surges following slug arrival does not cause surges in liquid flow from the stilling well to the separator chamber as pressure in the slug handling system 320 and the gas scrubber 330 are equalized.

This separator configuration 315 thus effectively manages slugs and associated pressure surges using a pressure balanced system with effective use of liquid hydraulic head, as detailed above, to ensure stable flow even under slugging conditions. This is achieved without additional instrumentation and controls thus providing for a highly reliable system with overall liquid level controls maintained at the bulk 3 phase separator 325.

Since sand is occasionally present in the incoming fluid, a sand trap 355 is installed at the bottom of the Stilling Well 350 where additional valves 360 will be added to periodically remove the sand. Separation of sand in liquid medium can occur via two main mechanisms:

(i) Change in momentum
(ii) Gravity Settling

As shown in FIGS. 5A and 5B, the Stilling Well 350 according to this embodiment, both mechanisms are employed, where the large diameter and its upward orientation of the outlet pipe from the stilling well allows the solid particles 317 to settle and with the abrupt change in direction of flow 316 create a momentum shift that would further aide separation.

Phases with different densities will have different momentum. If a two phase stream changes direction sharply, greater momentum will not allow the particles of the heavier phase to turn as rapidly as the lighter fluid, so separation occurs.

The diameter of the stilling well is sized to aid both gravity settling of sand and to provide adequate surge volume for liquid hold-up to ensure that instantaneous flow fluctuations are dampened.

The configuration of the Slug Handling Device 340 may simplify the controls associated with conventional slug catchers as it eliminates the need for liquid level and pressure control valve and shutdown valves, thus improves the reliability of the system. This also reduces the size of the slug handling device 340 compared to a conventional slug catcher as the slug handling device 340 needs to only cater for the maximum anticipated slug volume with liquid hold-up for final degassing being accommodated in the downstream 3 phase separator 325.

An inlet Heater 365 may be required upstream of the 3-phase separator 325 to provide heat to break the emulsion, thus enabling improved separation of oil and water. In a system according to the present invention, the flow rate may be limited by the available static head to overcome the pressure drop across the Inlet Heater and associated piping and fittings. This arrangement has the benefit of heating only the liquid stream and avoids heating of the gas stream which is bypassed via the Gas Bypass Line 342 of the Slug Handling Device 340. The system effectively utilizes the static head 386 available in the Stilling Well 350 to control flow through the Inlet Heater 365 and thus eliminates permanent pressure drop. This will result in reduced downstream compression power requirements. In addition, the configuration allows for a steady flow to the heater even under fluctuating incoming flow and pressure conditions typically associated to heavily slugging incoming fluid flow conditions.

The liquid is then conveyed to the Separator 380 in which the horizontal vessel is piggy backed with a vertical scrubber 405 according to a further embodiment of the present invention. The bulk gas/liquid separation will be in the horizontal part 380 of the system while gas scrubbing/polishing is performed in the vertical part 405 of the system. Gas, with entrained liquid, will exit the horizontal separator section via an outlet deflector plate. A specialty gas outlet device such as a mist mat, vane pack, etc is not provided at the gas outlet section of the horizontal separator section as for the reasons stated previously.

An expanded pipe, sized to minimize pressure drop routes gas (with entrained liquid) to the vertical gas scrubber section. The Gas Bypass Line 342 from the Slug Handling System 320 will connect with the expanded pipe from the separator before being passed through the gas scrubber.

The vertical gas scrubber section 330 is sized for the process conditions and gas flow and liquid carry-over from the horizontal separator section and the slug handling device. The scrubber 405 may be provided with typical internals designed to enhance gas liquid separation. An inlet distributor 415 is provided at the scrubber to reduce the inlet velocity and to give a good gas distribution in the vessel. A gas outlet demisting device 410 is also provided and may be a mist mat, vane pack, cyclonic or other proprietary internals depending on the specific application requirements.

Liquid separated at the vertical gas scrubbing section 405 is routed via a downcomer pipe 385 to the liquid pad of the horizon separator. The termination of the downcomer pipe 385 is to be below the low liquid level 390 in the horizontal separator 380 to ensure that gas does not bypass the separator via the downcomer pipe 385 under operating conditions. To avoid accumulation of oil phase in the downcomer pipe, the pipe is terminated above the high oil water interface level of the horizontal separator, 325. The pressure drop of the gas from the horizontal separator section 380 to the vertical scrubber section 405, including the scrubber inlet device 415 is to be less than the static liquid head in the downcomer pipe 385 from high liquid level in the horizontal separator 380 to the bottom of the vertical scrubber 405. This will ensure that liquid from the liquid pad of the separator section does not rise up the downcomer pipe 385 to the scrubber 380, due to siphon effect.

A differential pressure transmitter may be provided to monitor the performance of the system. In the case when the production liquid cause fouling and/or is waxy, a nozzle may be provided at the inlet pipe to the vertical scrubber 405 to enable hot water flushing of the inlet device (due to wax blockages and/or fouling) as required. Potential blockage or flow restriction at the inlet device is monitored by the differential pressure transmitter. In addition, hot water or solvent flushing facility may also be provided at the gas outlet device liquid draining compartment to remove blockages/restrictions as required.

The benefits of system according to the present invention may include over the conventional system may include:

1. A slug handling device that is capable of handling large slug volume and sand.
2. A heater to break the emulsion before the liquid enters the separator. The configuration of the system enables only liquid phase to be heated (thus minimizing heating duty) with flow through heater maintained steady thus ensuring accurate temperature control of the liquid phase.
3. A separate section i.e. the gas scrubber section is located above the horizontal bulk gas/liquid separator and will house the gas polishing internals. This will avoid potential contact of the gas outlet device with the bulk liquid due to turbulences, sloshing, etc.
4. The gas polishing section (or the gas secondary separation section) is provided with a downcomer pipe that terminates below the low liquid level of the main horizontal bulk gas/liquid separation section. This avoids the need to provide a separate liquid hold-up section for the vertical gas scrubber and avoids the need for dedicated level control and associated safeguarding instrumentation for the gas scrubber.
5. The gas polishing section is provided with an inlet distribution device to reduce the inlet momentum of the fluid and to enhance separation of the gas from liquid.
6. Online hot water flushing for cleaning
7. Smaller slug catcher as liquid hold-up and degassing is undertaken in the downstream 3 phase separator.
8. Smaller 3 phase separator as it need not make space for the gas outlet internals and gas handling capacity is reduced with gas bypassed at the slug handling device.
9. Smaller Scrubber as it need not have to cater for any liquid hold-up and surge volume The liquid level of the fluid in the stilling well 350 is dependent on the pressure drop of the liquid through the heat exchanger. Hence, the heat exchanger is sized for minimal pressure drop to minimize the height of the slug handling device, 340 relative to the bulk separator, 325. Note that the line between the stilling well 350 and the bulk separator, 325 may include any other flow restricting device, like a restriction orifice, if a heat exchanger is not required for the service.

Figure 6:
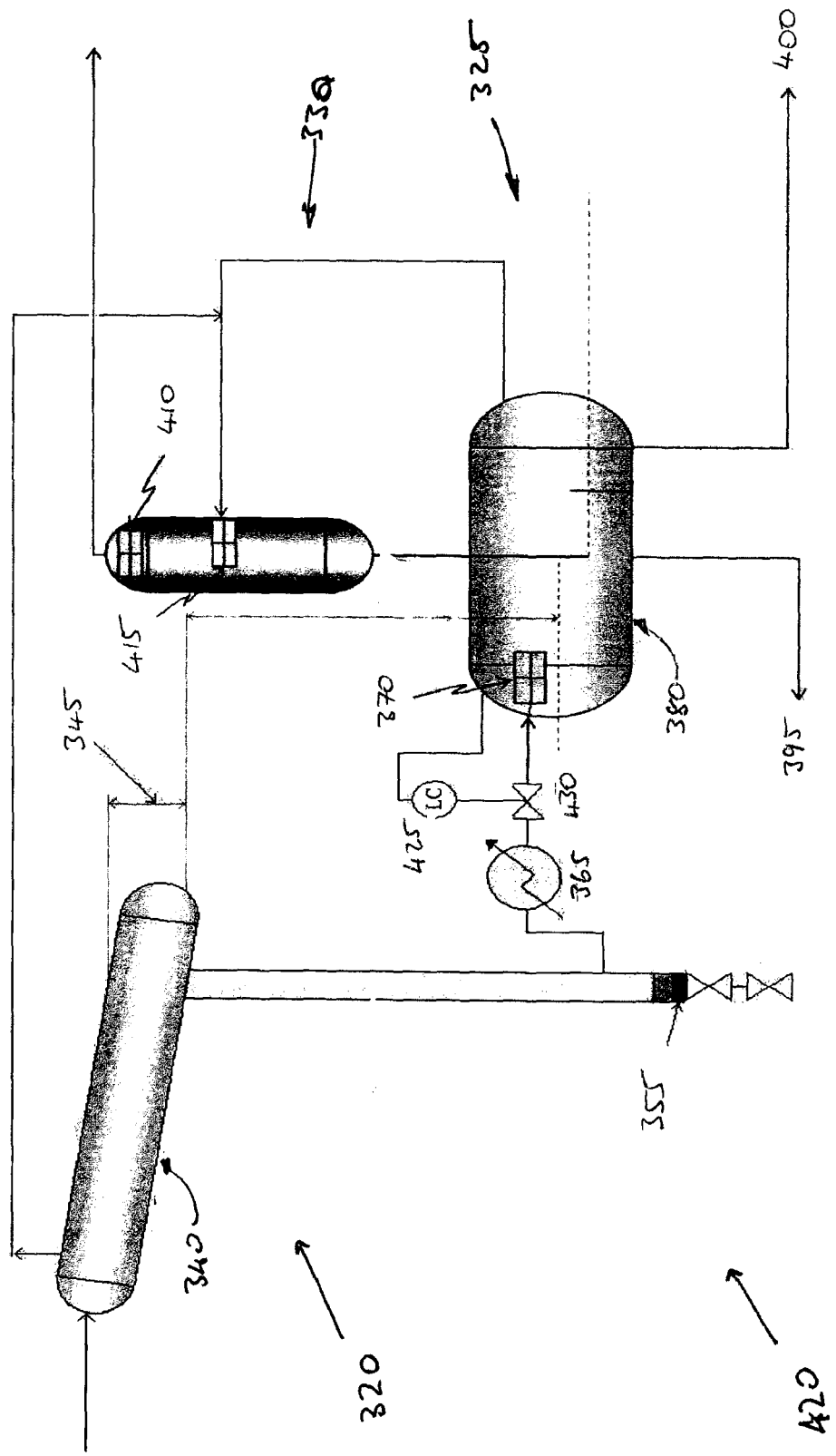
FIG. 6 is a schematic view of a slug handling system within a separator system according to a further embodiment of the present invention.

The liquid level in the stilling well increases, as a result the liquid flow to the Heater and Separator will increase. To provide additional protection against high liquid level in the Separator, a further embodiment as shown in FIG. 6 may be adopted. In this system 420, a control valve 430 is installed upstream to the separator 380. During normal operation, the control valve 430 may be left open to maintain the liquid level and minimize the pressure drop of the system. When large liquid surge is expected (e.g. during a pigging operation), the liquid surge entering the separator is attenuated on high liquid level at the Separator 380 by adjusting the control valve 430.

In some cases, a restriction orifice may be used instead of the valve to restrict the large surge from entering the separator to ensure that overall pressure drop under normal maximum flow conditions maintains liquid level in the stilling well near the top of the stilling well. This ensures that when slug arrives, the slug volume is accommodated within the slug handling device, thus minimizing static head rise 345 on slug arrival. This ensures steady flow of liquid to the bulk separator via the heater even under slugging conditions.

Figure 7:
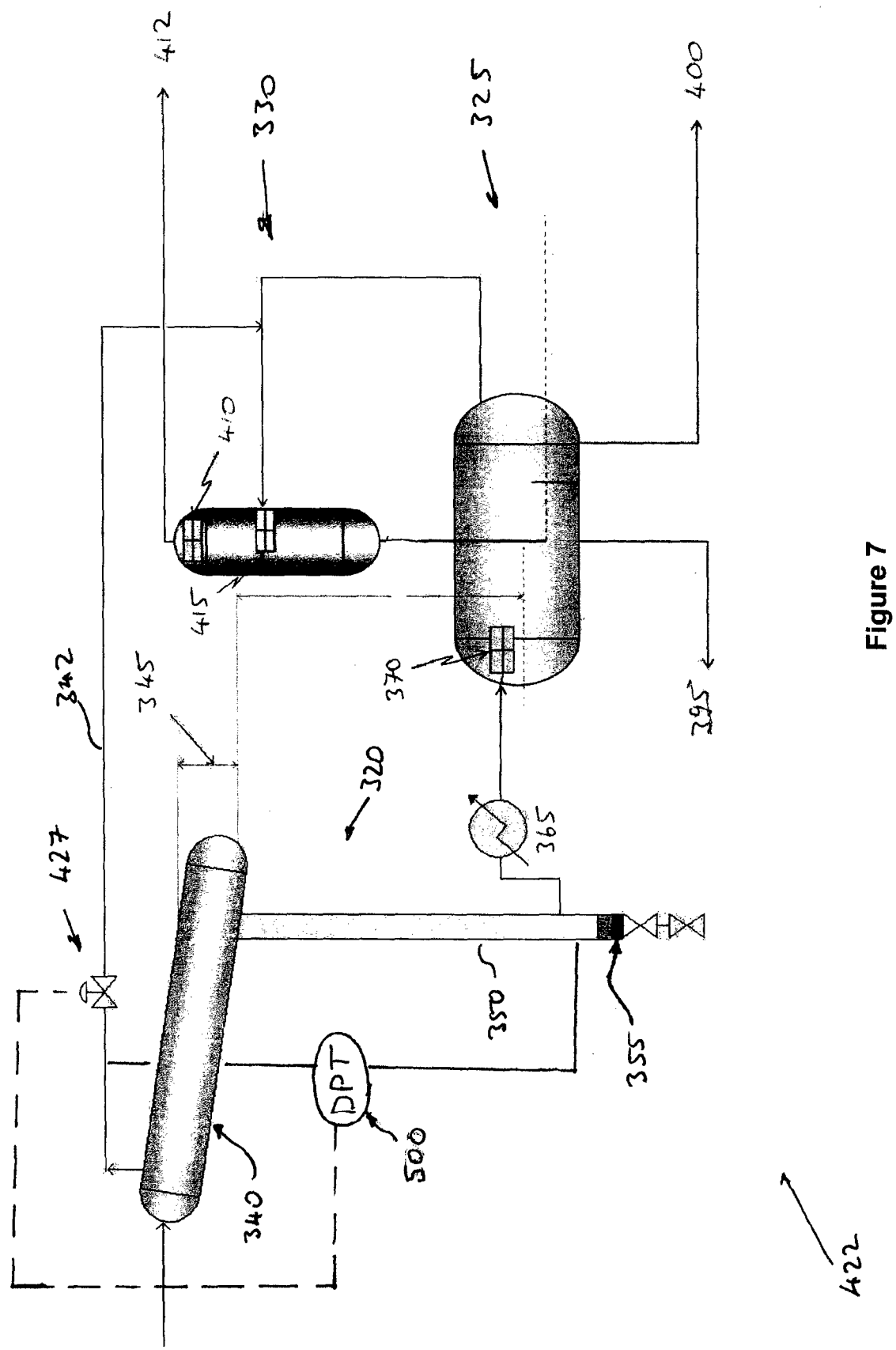
FIG. 7 is a schematic view of a slug handling system within a separator system according to one embodiment of the present invention.

Another variation is to provide a control valve 427 with minimum pressure drop when in open position at the Gas Bypass Line 342. This embodiment is illustrated in FIG. 7. For this system 422, the control valve 427 is normally kept in a wide open position. As the pressure drop across the Heater 365 increases, such as due to fouling, the liquid level in the Stilling Well 350 increases also. The liquid level in the Stilling Well 350 is measured using a differential pressure transmitter 500 between the Stilling Well base and Slug Handling Device 340. On high liquid level detection at the Stilling Well 350, the control valve 427 at the Gas Bypass Line 342 will throttle close to provide the pressure drive necessary to evacuate the liquid from the Slug Handling Device 320 to the Separator 325. In addition, if the liquid level in the Separator 325 reaches high level, an override Separator high level control signal may be provided to throttle open the control valve to prevent high level in the Separator. Although the liquid that flows through the gas bypass line 342 eventually ends up in the 3-phase separator 325, this condition is undesirable as the liquid does not pass through the heater, 365 to break the emulsions.

Figures 8A, 8B:
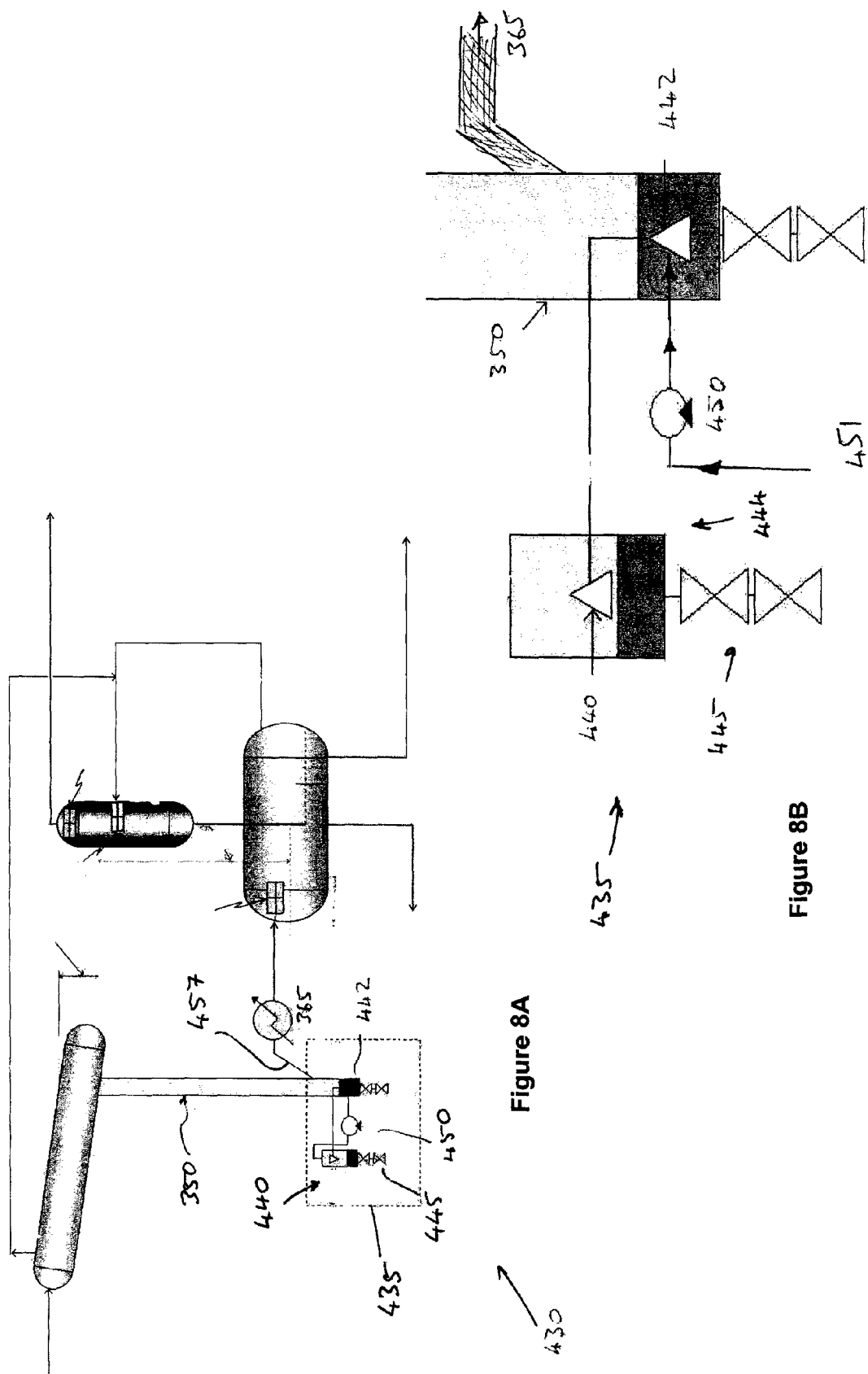
FIGS. 8A and 8B are schematic views of a slug handling system within a separator vessel according to one embodiment of the present invention.

There are two methods considered in this system for sand separation; gravity settling & change in momentum of the sand and cyclonic sand removal device. FIGS. 8A & 8B shows a cyclonic sand removal device 435 adapted for use with a system 430 according to the present invention. The pipe 457 from the stilling well 350 to the inlet heater 365 is inclined at an angle to minimize the presence of sand in the production fluid to the separator. This cyclonic sand removal device 435 functions continuously where sand is removed from the Stilling Well 350 using a conventional or proprietary cyclonic device.

With the introduction of a liquid jetting stream 451, the cyclonic device 442 generates a vortex which fluidizes solids within their surrounding area so as to form a suspension of sand/solids. When fluidized, or suspended, the solids are drawn to the cyclonic device discharge pipe allowing for controlled hydro-transportation out of the stilling well. The solids are transported to the de-sander vessel 444 where the solids are separated from the discharge sand slurry stream. The de-sanding operation may be semi-automated with operators activating an automatic sequence or continuously operated depending on the sand content of the production fluid. The sand may be removed through valve controlled outlet 445 while the separator remains online with no interruption to production. To assist in the removal of sand from the slurry in the de-sander vessel 444, a further cyclonic sand removal device 440 may be employed to separate the sand from the sand/liquid slurry.

Figures 9A, 9B:
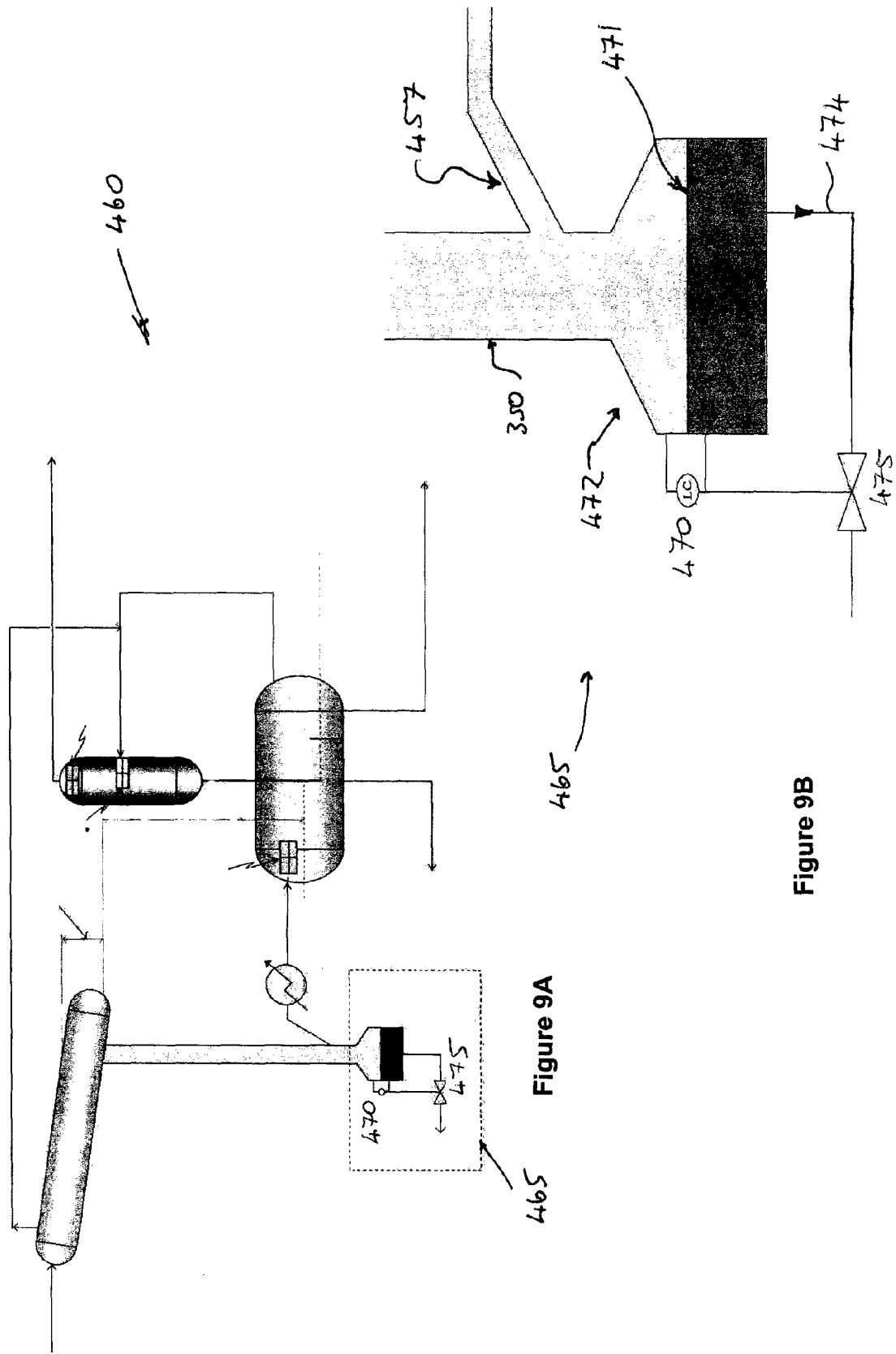
FIGS. 9A and 9B are schematic views of a slug handling system within a separator system according to a further embodiment of the present invention.

In a further embodiment, a system 460 may include a bulk water separator 465. FIGS. 9A and 9B show a configuration of the system 460 for the removal of water from the system before the 3-phase separation. In this embodiment, the stilling well 350 may include an enlarged base, such as with an increasing diameter towards the base 472 of the well in order to provide adequate capacity and, consequently, residence time for the water to settle at the bottom of the Stilling Well. An outlet control valve 475 is connected at the water outlet line 474 from the Stilling Well 350 to drain the water based on the interface level control 470 should a pre-determined oil/water interface level be reached. To prevent sand entrainment, the water outlet nozzle is elevated from the base of the stilling well. The bulk water separation reduces the heat duty of the inlet heater, thus minimizes the size of the heater.

The invention claimed is:

1. A separator system (5) comprising;
a separation chamber (10) arranged to separate liquid from an inflow production fluid (45);
at least one gas scrubber (15) for removing entrained liquid from both an external gas inflow and a separated gas inflow from said separation chamber (10);
wherein said at least one gas scrubber (15) is positioned above and proximate to said separation chamber (10), said gas scrubber (15) and separation chamber (10) connectable through a vertically oriented at least one liquid outflow conduit (20) arranged to direct the removed entrained liquid from the gas scrubber (15) to the separation chamber (10) wherein the conduit (20) is arranged such that an outflow end (22) of said conduit (20) extends into the separation chamber (10) such that it is lower than a minimum threshold liquid depth (65) in said separation chamber (10);
wherein a connecting pipe (25) includes an inlet distribution device (35) proximate to the gas scrubber (15) for dissipating the separated gas inflow into said gas scrubber, and;
further including a wax removal system (26) mounted to said connecting pipe (25), said wax removal system (26) arranged to direct a jet of hot fluid onto said inlet distribution device (35), said fluid comprising any one, or a combination, of water, steam, diesel or solvent.

2. The separator system (5) according to claim 1 wherein the conduit (20) is of a length from a base of the gas scrubber (15) so as to provide a liquid static head in the conduit pipe due to a pressure drop of gas as it traverses from the separator chamber (10) to the gas scrubber (15) is maintained within the conduit (20).

3. The separator system (5) according to claim 1, wherein there is exactly one said gas scrubber (15) positioned above and proximate to said separation chamber (10).

4. The separator system (5) according to claim 3, wherein there is exactly one said liquid outflow conduit (20) arranged to direct the removed entrained liquid from the gas scrubber (15) to the separation chamber (10).

5. The separator system (5) according to claim 1, wherein the gas scrubber (15) is mounted to the separation chamber (10).

6. The separator system (5) according to claim 1, wherein the gas scrubber is attached to the separation chamber by a supporting framework.

7. The separator system (5) according to claim 1, wherein the separated gas inflow is directed from the separation chamber (10) to the gas scrubber (15) through a connecting pipe (25), said connecting pipe having a deflector plate (30) proximate to the separation chamber to hinder the transport of liquid through said connecting pipe.

8. The separator system (5) according to claim 1, wherein said wax removal system (26) includes a differential pressure transmitter for measuring differential pressure between said separation chamber and the gas scrubber, said wax removal system arranged to activate the hot fluid jet on the differential pressure exceeding a predetermined threshold.

9. The separator system according to claim 1, wherein the gas scrubber is elongate and vertically arranged.

10. The separator system according to claim 1 wherein the gas scrubber is elongate and horizontally arranged.

11. The separator system according to claim 1, further including a heat exchanging device mounted within the gas scrubber for dissipating heat from the separated gas inflow.

12. The separator system according to claim 1, further comprising
a slug handling device (320), said slug handling device (320) comprising a separation device (340) for receiving the inflow production fluid (335) through an inlet pipe, said separation device (340) inclined to the horizontal and arranged to separate a gas stream and liquid stream;
a stilling well (350) for receiving the separated liquid and routing said separated liquid to separator chamber (325);
a gas bypass line (342) connecting the separation device (340) and the gas scrubber (330) arranged to rout the separated gas stream to the gas scrubber and consequently equalize pressure between said separation device and gas scrubber;
wherein the slug handling device is positioned above the separator chamber (325) such that a normal liquid level (346) in the stilling well provides sufficient liquid head (386) to overcome a pressure drop due to liquid flow from the stilling well to the separator chamber.

13. A separator system according to claim 12 wherein a conduit for routing the separated liquid from the stilling well (350) to the separation chamber includes one or both of a heat exchanger or a restriction orifice.

14. A separator according to claim 12 wherein the stilling well is sized for the larger of liquid surge volume to maintain steady flow or to facilitate gravity settling of sand.

15. The separator according to claim 12 wherein said stilling well includes a sand trap (355) so as to allow solids within said separated liquid to settle, said stilling well further including an outlet above the sand trap so as to discharge said separated liquid to the separation chamber (10).

16. The separator system according to claim 12, wherein said separation device (340) comprises one of a separator or expanded pipe, said separation device (340) arranged to create a stratified flow regime for said inflow production fluid so as to yield the separation of the gas stream and liquid stream.

17. The separator system according to claim 12, wherein said separation device (340) comprises one of a separator or expanded pipe, said separation device volume sized to accommodate the largest anticipated slug volume from the inlet stream (335).

18. The separator system according to claim 12 wherein said stilling well includes a sand trap (355) so as to allow solids within said separated liquid to settle, the outlet above the sand trap including an outlet pipe (457) inclined upwards so as to prevent sand from exiting said stilling well (350).

19. The separator system according to claim 12, wherein the stilling well includes a said removal assembly (435) within said sand trap, said sand trap assembly including at least cyclonic device (442) within said sand trap for agitating sand into suspension, and an outlet for discharging liquid having the sand in suspension.

20. The separator device according to claim 19, wherein said sand removal assembly having an intermediate sand trap (444) having a further valve controlled outlet (445) arranged such that the liquid is discharged to the intermediate sand trap (444), prior to final discharge.

21. The separator device according to claim 20, wherein the intermediate sand trap includes a further cyclonic device (440) for separating the sand from the liquid phase in the intermediate sand trap prior to collection or discharge of sand via a further valve controlled outlet (445).

22. The separator device according to claim 12, wherein the gas bypass line includes a control valve, said control valve arranged to close on high liquid level in the slug handling device or the stilling well so as to prevent liquid outflow into the gas bypass line at the slug handling device.

23. The separator device according to claim 12, wherein outlet from the stilling well includes a control valve (430) for controlling the flow of liquid to the separator chamber (10).

24. The separator device according to claim 12, wherein the stilling well (350) includes an enlarged base (472) for increasing the capacity of said stilling well base and an outlet control valve (475) arranged to release water from the enlarged base on exceeding a pre-determined oil-water interface level within said stilling well (350).

25. A separator system (5) comprising:
a separation chamber (10) arranged to separate liquid from an inflow production fluid (45);
at least one gas scrubber (15) for removing entrained liquid from both an external gas inflow and a separated gas inflow from said separation chamber (10);
wherein said at least one gas scrubber (15) is positioned above and proximate to said separation chamber (10), said gas scrubber (15) and separation chamber (10) connectable through a vertically oriented at least one liquid outflow conduit (20) arranged to direct the removed entrained liquid from the gas scrubber (15) to the separation chamber (10) wherein the conduit (20) is arranged such that an outflow end (22) of said conduit (20) extends into the separation chamber (10) such that it is lower than a minimum threshold liquid depth (65) in said separation chamber (10);
further comprising a slug handling device (320), said slug handling device (320) comprising a separation device (340) for receiving the inflow production fluid (335) through an inlet pipe, said separation device (340) inclined to the horizontal and arranged to separate a gas stream and liquid stream;
a stilling well (350) for receiving the separated liquid and routing aid separated liquid to separator chamber;
a gas bypass line (342) connecting the separation device (340) and the gas scrubber (330) arranged to rout the separated gas stream to the gas scrubber and consequently equalize pressure between said separation device and gas scrubber;
wherein the slug handling device is positioned above the separator chamber (325) such that a normal liquid level (346) in the stilling well provides sufficient liquid head (386) to overcome a pressure drop due to liquid flow from the stilling well to the separator chamber, and;
the stilling well includes a sand removal assembly (435) within said sand trap, said sand trap assembly including at least cyclonic device (442) within said sand trap for agitating sand into suspension, and an outlet for discharging liquid having the sand in suspension;
said sand removal assembly having an intermediate sand trap (444) having a further valve controlled outlet (445) arranged such that the liquid is discharged to the intermediate sand trap (444), prior to final discharge.

26. The separator device according to claim 25, wherein the intermediate sand trap includes a further cyclonic device (440) for separating the sand from the liquid phase in the intermediate sand trap prior to collection or discharge of sand via a further valve controlled outlet (445).

* * * * *